United States Patent [19]

Benjamin et al.

[11] 4,277,209

[45] Jul. 7, 1981

[54] THREADING ATTACHMENT

[75] Inventors: Milton L. Benjamin, Moreland Hills; Wilbur N. Miles, Chagrin Falls, both of Ohio

[73] Assignee: Erickson Tool Company, Solon, Ohio

[21] Appl. No.: 99,936

[22] Filed: Dec. 3, 1979

[51] Int. Cl.³ .................. B23Q 5/22; F16D 11/04; B21K 1/56
[52] U.S. Cl. .................. 408/139; 10/89 F; 192/67 R
[58] Field of Search ............ 10/89 F; 192/21, 67 R; 408/139, 140, 141, 142

[56] References Cited

U.S. PATENT DOCUMENTS

| 3,002,206 | 10/1961 | Johnson | 408/139 |
|---|---|---|---|
| 3,717,892 | 2/1973 | Johnson | 10/89 F |
| 3,946,844 | 3/1976 | Johnson | 192/67 R |
| 3,999,642 | 12/1976 | Johnson | 408/139 X |
| 4,014,421 | 3/1977 | Johnson | 408/139 X |
| 4,029,429 | 6/1977 | Johnson | 408/142 |

Primary Examiner—Harrison L. Hinson
Attorney, Agent, or Firm—Pearne, Gordon, Sessions, McCoy & Granger

[57] ABSTRACT

A reversible driver for a threading tool, such as a tap or die, is disclosed. The driver has rotary input and output members with a forward clutch connected therebetween and a reverse clutch connected through reverse gearing between the input and the output members. Each clutch has drive and driven clutch elements and a first spring urges both forward and reverse clutches toward engagement. A second spring is stronger than the first spring and urges the forward clutch toward engagement so that a tap rotated by the output member will tap a hole in a workpiece until the forward clutch is released. Each clutch utilizes a plurality of substantially hemispherical projections engaging longitudinal abutments as a form of dog clutch. The foregoing abstract is merely a resume of one general application, is not a complete discussion of all principles of operation or applications, and is not to be construed as a limitation on the scope of the claimed subject matter.

12 Claims, 4 Drawing Figures

THREADING ATTACHMENT

BACKGROUND OF THE INVENTION

A number of threading attachments such as tap drivers have been devised, including reversible units. Patents such as U.S. Pat. Nos. 3,002,206 and 3,717,892 have shown radial cylindrical pins fixed in the output member as the driven clutch element. Other prior art designs, such as U.S. Pat. Nos. 3,946,844; 3,999,642; 4,014,421 and 4,029,429, have utilized a three-part clutch with freely rolling balls in a cage sleeve, the balls acting between inner and outer splines.

These constructions are ones which require a high degree of precision in the machining or forming of the parts in order to have accurate alignment of the parts and in order to have adequate torque transmitting ability of the forward and reverse clutches. Such accuracy in machining is expensive to obtain.

The problem to be solved is how to obtain a threading attachment of the tap-driver type which is rugged yet maintains accurate alignment and which has a minimum of parts requiring accurate machining. Another problem to be solved is how to obtain smooth clutch engaging action for engagement of both the forward and reverse clutches.

SUMMARY OF THE INVENTION

This problem is solved by a threading attachment, comprising in combination, an outer case, input and output members coaxially journalled relative to each other in said case, a clutch having drive and driven clutch elements and connected between said input and output members, one of said clutch elements having a plurality of substantially axially parallel abutment shoulders, the other of said clutch elements having substantially hemispherical, non-rotating, lateral projections adapted to rotationally engage said shoulders for a dog clutch engaged condition, said clutch elements being relatively longitudinally movable apart to establish a clutch-disengaged condition, and spring means relatively urging said clutch elements longitudinally toward engagement, whereby a threading tool rotated by said output member will thread a workpiece until the clutch is disengaged.

The problem is further solved by a threading attachment, comprising, in combination, an outer case, input and output members coaxially journalled relative to each other in said case, a forward clutch having drive and driven clutch elements and connected between said input and output members, gearing connected to said input member and having a reverse rotational direction output relative to said input member, a reverse clutch having drive and driven clutch elements connected between said reverse rotational direction gearing output and said output member, said forward and reverse driven clutch elements each being axially movable relative to said output member, first spring means urging said forward and reverse clutches toward engagement, and second spring means stronger than said first spring means urging said forward clutch elements into engagement, whereby a threading tool rotated by said output member will thread a workpiece until said forward clutch is disengaged, and whereby said reverse clutch may be engaged to drive the threading tool in reverse.

An object of the invention is to provide a stronger tapping attachment with the dog clutch having a greater number of driving teeth and mounted at a greater radius from the axis.

Another object of the invention is to provide a tapping attachment wherein a soft spring urges both the driven forward and reverse clutch elements toward engagement for smooth clutch action.

Another object of the invention is to provide a tapping attachment with a second spring which urges the forward clutch toward engagement and overcomes the force of a first spring urging both a forward and reverse clutch toward engagement.

Other objects and a fuller understanding of the invention may be had by referring to the following description and claims, taken in conjunction with the accompanying drawing.

DESCRIPTION OF THE PREFERRED EMBODIMENT

Figure 1:
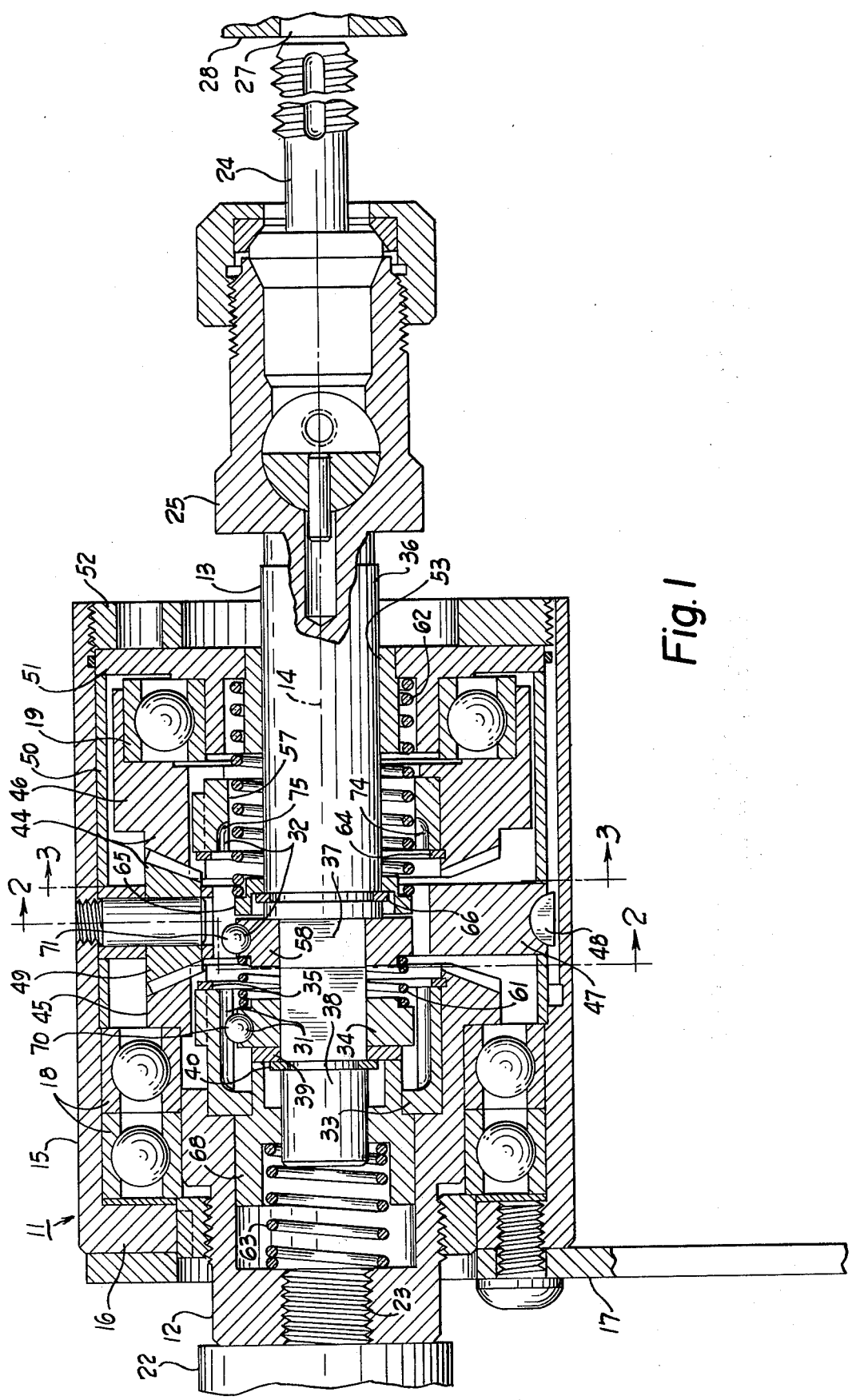
FIG. 1 is a longitudinal, sectional view of a tapping attachment of the invention.
Figure 2:
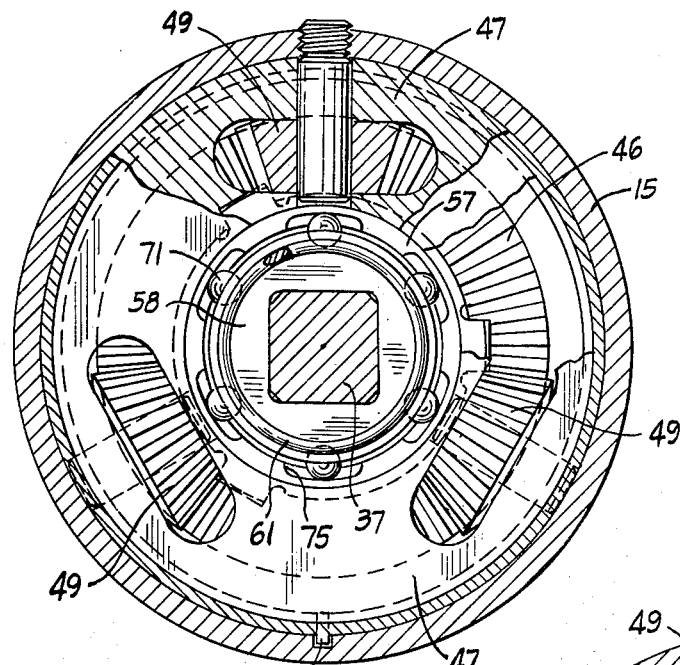
FIG. 2 is a sectional on line 2—2 showing the forward clutch.
Figure 3:
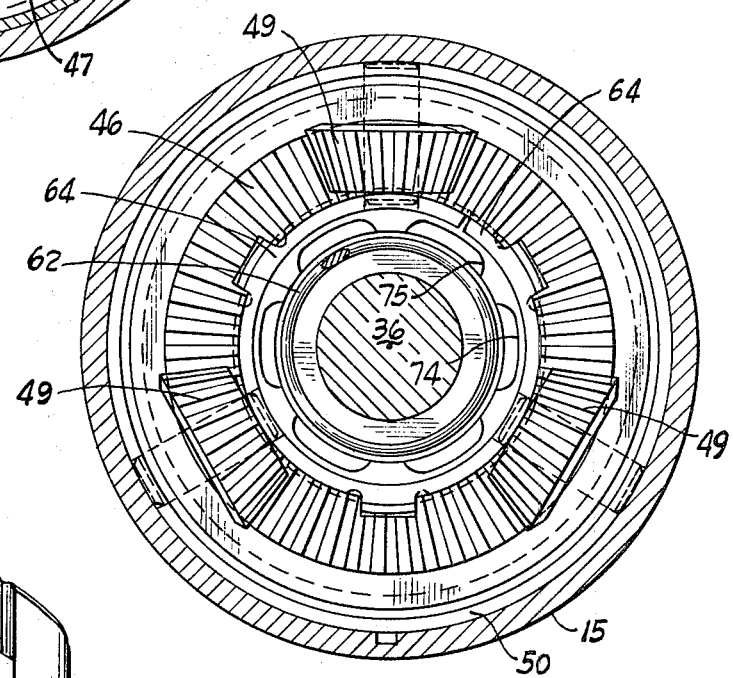
FIG. 3 is a sectional on line 3—3 showing the reverse clutch.
Figure 4:
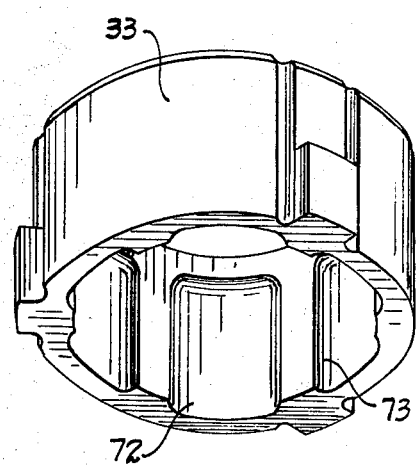
FIG. 4 is an isometric view of the forward clutch drive element.

The FIGS. of the drawing illustrate a threading attachment 11 which has a rotatable input member 12 and a rotatable output member 13. An outer case 15 is provided and conveniently this may be cylindrical in shape with an end wall 16 to which a torque arm 17 may be attached. This arm 17 may abut a stationary abutment in order to hold the outer case 15 nonrotating. The input and output members 12 and 13 are relatively rotatable about an axis 14 and in the preferred embodiment each is journalled relative to the outer case 15. The input member 12 is journalled by ball bearings 18 and the output member 13 is journalled by a bearing 19.

The threading attachment 11 is adapted to be used with a rotating spindle 22 to which the input member 12 is attached at threads 23. The output member 13 is adapted to carry some form of a threading tool, which may be a die but is usually a tap 24 held in some form of a connector, such as the collet 25. As stated above, the threading tool 24 may be either a die or tap, but hereinafter will be referred to as a tap for convenience of reference.

The threading attachment 11 is free-floating in that the spindle 22 may be rotated and fed downwardly so that the tap 24 enters a drilled hole 27 in a workpiece 28. Once the threads are started in the workpiece, then the tapping attachment is self-feeding and does not rely upon any lead screw forward feeding of the spindle 22.

The threading attachment 11 is releasable by means of a dog clutch which is released upon the forward feed of the spindle being stopped and the forward feed of the output member 13 being continued by the threading of the tap 24 into the workpiece 28. The present invention may be embodied in such a threading attachment, which is merely of the releasable type, but, as shown in the preferred embodiment, the attachment includes both a forward clutch 31 and a reverse clutch 32. The forward clutch 31 includes a clutch drive element 33 and a clutch driven element 34. The drive element 33 is splined to the input member 12 and held by a snap ring 35. The output member 13 is in the form of an elongated shaft having the collet 25 on the lower end thereof, a cylindrical portion 36, a square cross section portion 37 and a cylindrical portion 38. The clutch driven element 34 has a square aperture fitting on the square cross section portion 37 and is held in place by a washer 39 and a snap ring 40.

The threading attachment 11 is not only self-feeding and a releasable unit, but it is also self-reversing. In this construction, the reverse clutch 32 is used. Gearing 44 is provided within the threading attachment 11 to provide a reverse rotational direction output relative to the direction of rotation of the input member 12. This gearing 44 is shown as a planetary gearing including a first bevel gear 45 driven in accordance with rotation of the input member 12, and in this embodiment is shown as being unitary with this input member. A second bevel gear 46 is journalled by the bearing 19 in the lower end of the case 15. A planet gear carrier 47 is fixed to the outer case 15 by the key 48 and carries a plurality, here shown as three in number, of planet bevel pinions 49. These pinions mesh between the first and second bevel gears 45 and 46 to drive the bevel gear 46 in a rotational direction opposite to that of the first bevel gear 45. A bushing spacer 50 holds the planet gear carrier 47 in the proper longitudinal position. A lower bearing plate 51 carries the inner case of the bearing 19 and is held in place by a nut 52. This lower bearing plate 51 also centers a sleeve bearing 53 which slidably and rotationally journals the cylindrical portion 36 of the output member 13.

The reverse clutch 32 includes a clutch drive element 57 and a driven element 58. The driven element 58 has a square internal aperture fitting on the square cross section portion 37 of the output member 13. A first spring 61 acts between the forward and reverse clutch driven elements 34 and 58, urging each one toward clutch engagement and urging these two driven elements apart. The reverse clutch drive element 57 is splined to the second bevel gear 46 for rotation therewith and held longitudinally in place by a snap ring 64. A second spring 62 is stronger than the first spring 61 and acts between the lower bearing plate 51 and a spring retainer 65 held by a snap ring 66 to the output member 13. A third spring 63 is stiffer than the second spring 62 and acts between the input member 12 and a spring cup 68.

The forward and reverse clutch driven elements 34 and 58 each have a plurality of substantially hemispherical projections 70 and 71, respectively. The projections 70 on the forward clutch driven element 34 are adapted to longitudinally slide into grooves 72 in the forward clutch drive element 33. These grooves are formed by longitudinally parallel abutments 73. During rotation of the drive element 33, the longitudinal abutments 73 are adapted to drivingly engage the plurality of hemispherical projections 70 to impart driving torque to the output member 13. In a similar manner, the reverse clutch driven element 58 has the hemispherical projections 71 which are adapted to longitudinally slide into grooves 74 in the reverse clutch drive element 57 and these grooves are formed by longitudinally parallel abutments 75. These abutments are adapted to rotationally abut the hemispherical projections 71 to impart reverse rotational torque to the output member 13.

OPERATION

The threading attachment 11 is adapted to be mounted on a rotatable and longitudinally movable spindle 22. The torque arm 17 is adapted to be abutted by some fixed abutment which prevents rotation of the outer case 15, yet permits longitudinal movement of the entire threading attachment 11. The collet 25 is adapted to hold some form of a threading tool, such as a die, or, as shown, a tap 24, to tap a hole 27 in a workpiece 28. The threading attachment 11 is a free-floating design as permitted by the second spring 62 so that it is not dependent on any lead screw within the spindle 22 to provide a positive and defined forward feed relative to the rotational speed of the spindle 22. As such, the threading attachment 11 is adaptable to many uses, including manual, semi-automatic, and automatic machine tools, including numerical control and computer numerical control. The threading attachment 11 is a releasing type attachment, and by this is meant that it is not necessary to stop the spindle 12 upon completion of the forward tapping operation; instead, the forward clutch 31 releases by pulling apart longitudinally and stops the output member 13 and tap 24, even though the spindle 22 continues to rotate. The free-floating operation of the threading attachment 11 means that as the threading attachment 11 is fed forwardly so that the tap 24 engages the hole 27, then the feeding will take place by the self-threading action of the tap 24 into the hole 27. It will be noted that the second spring 62, which is stronger than the first spring 61, urges the forward clutch 31 into engagement, which means that the reverse clutch 32 is normally out of engagement, as shown in FIG. 1. Assuming a right-hand tap 24 and clockwise rotation of the spindle 22 as looking forwardly to the workpiece 28, this provides clockwise rotation of the tap 24 to thread it into the hole 27. Once the threads are started, then the spindle forward feed 22 may be continued for a predetermined amount and then stopped. Upon stopping of the forward or downward longitudinal feed of the spindle 22, the forward clutch 31 begins to separate. The separation is complete when the ball projections 70 leave the lower end of the grooves 72. At the instant of separation, the weak spring 61 compresses slightly for smooth disengagement of this forward clutch. When this occurs, the tap 24 stops rotating because the forward and the reverse clutches 31 and 32 are disengaged. This is because the output member 13 is moved forwardly far enough relative to the spacing between the clutch driven elements 34 and 58, so that the forward clutch ball projections 70 are out of the grooves 73 and the reverse clutch ball projections 71 are also out of engagement with the grooves 74 in the reverse clutch drive element 57.

Next, upon retracting the spindle 22, while still rotating in the forward direction, this will engage the reverse clutch 32. The ball projections 71 enter the grooves 74, aided by the weak spring 61, to provide smooth engagement of this reverse clutch. Through the gearing 44, the reverse clutch drive element 57 is driven in the reverse direction, and with the engagement of this reverse clutch, the tap 24 is driven in the reverse rotational direction to back it out of the tapped hole in the workpiece 28.

An advantage of the present construction of threading attachment is accuracy combined with strength. Fewer parts are utilized in this self-reversing tap driver than in many competitive units and, hence, the cumulative tolerance can be smaller with the same amount of tolerance on the individual parts. The threading attachment is a strong unit because the clutch drive and driven elements utilize six hemispherical projections engaging six abutment walls of the grooves, rather than only two or three abutments, as in a number of competing units. Also, the radius from the axis to the line contacts of clutch engagements is greater than a number of competing units which have such line contact engagements close to the output shaft. Still further, the ball projections and the abutment walls in the clutch drive elements may be easily machined and then hardened to provide long life. The forward clutch driven element 34 is separate from the reverse clutch driven element 58. This separates the two functions and essentially doubles the life of the unit because the wear is distributed between these forward and reverse clutch elements.

It will be noted that only a single spring 61 is utilized for acting on both the forward and reverse driven clutch elements 34 and 58. This single spring acts to urge toward engagement each of the forward and reverse clutches. This spring is a relatively weak spring, with less force than the second spring 62. The main purpose of this spring 61 is to aid the engagement and disengagement of the two clutches. The disengagement of each clutch is less of a problem than the engagement. Consider first the completion of the in and out tapping cycle. Just prior to this, the tap is running in reverse as it is being backed out of the tapped hole. As soon as the tap threads leave the tapped hole, the compressed second spring 62 urges the output member 13 longitudinally into the threading attachment 11. This quickly disengages the reverse clutch 32 and engages the forward clutch 31. This forward clutch must take the blow of the half-balls 70 attempting to enter the grooves 72 and the longitudinal abutments 73 must take the force of this blow and effect stopping of the reverse rotation and establishing forward rotation of the output member 13, collet 25, and tap 24, despite the inertia of these parts. The soft spring 61 will compress slightly to permit smooth engagement of this forward clutch 31 under these conditions.

However, the initial engagement of the reverse clutch 32 may often be a greater blow on the threading attachment 11. At the completion of the forward tapping action of the tap 24 into the hole, the forward clutch has pulled apart to stop rotation of the output member 13. Then as the spindle 22 is retracted upwardly, the reverse clutch 32 must engage. The tap 24 remains stationary as threaded into the hole 27 and the retractile movement of the spindle 22 compresses the second spring 62 until the reverse clutch engages. As the ball projections 71 try to enter the grooves 74, the weak first spring 61 compresses slightly until the reverse clutch 32 actually engages. Therefore, this spring 61 aids this smooth engagement of this reverse clutch 32 in the same manner as it aids the smooth engagement of the forward clutch 31. When this reverse clutch 32 actually engages, it must absorb the blow of accelerating against the stationary inertia of the output member 13, collet 25 and tap 24, and in addition, must overcome the frictional resistance of backing the tap 24 out of the threaded hole. This is why this blow on the reverse clutch 32 is often greater than the blow on the forward clutch, yet this soft spring 61 permits the smooth engagement of these clutches. This is also helped by the small weight and light inertia of the clutch driven elements 34 and 58. Also, the large radius to the ball projections 70 and 71, the large number of these projections, and the square cross section portion 37 engaging the clutch driven elements all contribute to large torque capacity and long life for the threading attachment 11.

The third spring 63 is used as a cushion for overadvance of spindle feed, should this occur. If such spindle were attempted to be fed forwardly faster than the tap 24 was threading itself into the hole 27, then this relatively stiff spring 63 would be compressed to accommodate such overfeed.

The hemispherical projections 70 and 71 are provided on one of the clutch drive and driven elements, and as shown in the preferred embodiment, they are on the driven elements. The soft spring 61 acts between the two driven clutch elements, urging them apart and also urging both the forward and reverse clutches toward engagement.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A threading attachment, comprising in combination,
   an outer case,
   input and output members coaxially journalled relative to each other in said case,
   a clutch having drive and driven clutch elements and connected between said input and output members,
   one of said clutch elements having a plurality of substantially axially parallel abutment shoulders,
   the other of said clutch elements having substantially hemispherical non-rotating lateral projections adapted to rotationally engage said shoulders for a dog clutch engaged condition,
   said clutch elements being relatively longitudinally movable apart to establish a clutch disengaged condition, and
   spring means relatively urging said clutch elements longitudinally toward engagement, whereby a threading tool rotated by said output member will thread a workpiece until the clutch is disengaged.

2. A threading attachment as set forth in claim 1, wherein said hemispherical projections are carried on said driven clutch element.

3. A threading attachment as set forth in claim 1, wherein said abutments are equal in number to said projections.

4. A threading attachment as set forth in claim 1, including a second clutch in said tap driver,
   and hemispherical non-rotating lateral projections in said second clutch.

5. A threading attachment as set forth in claim 1, including a second spring yieldably urging said clutch elements longitudinally toward engagement.

6. A threading attachment as set forth in claim 5, wherein said second spring acts on said output member and said clutch driven element and said first-mentioned spring means acts on only said clutch driven element,
   and said second spring is stronger than said first-mentioned spring means.

7. A threading attachment, comprising, in combination,
   an outer case,
   input and output members coaxially journalled relative to each other in said case, a forward clutch having drive and driven clutch elements and connected between said input and output members, gearing connected to said input member and having a reverse rotational direction output relative to said input member, a reverse clutch having drive and driven clutch elements connected between said reverse rotational direction gearing output and said output member, said forward and reverse driven clutch elements each being axially movable relative to said output member, first spring means urging said forward and reverse clutches toward engagement, and second spring means stronger than said first spring means urging said forward clutch elements into engagement, whereby a threading tool rotated by said output member will thread a workpiece until said forward clutch is disengaged, and whereby said reverse clutch may be engaged to drive the threading tool in reverse.

8. A threading attachment as set forth in claim 7, wherein said first spring means urges an element of said forward clutch in a first longitudinal direction and urges an element of said reverse clutch in the opposite longitudinal direction.

9. A threading attachment as set forth in claim 7, wherein said first spring means acts between said driven clutch elements urging them apart.

10. A threading attachment as set forth in claim 7, including a substantially hemispherical projection on one of said clutch elements and a longitudinally extending abutment on the cooperating clutch element.

11. A threading attachment as set forth in claim 10, wherein said hemispherical projection is on the driven clutch element.

12. A threading attachment as set forth in claim 10, wherein each of said forward and reverse clutches is constructed with substantially hemispherical projections.

* * * * *